UNITED STATES PATENT OFFICE.

MATTHIAS LATTEN, OF LEVERKUSEN, NEAR COLOGNE, GERMANY, ASSIGNOR TO SYNTHETIC PATENTS CO., INC., OF NEW YORK, N. Y., A CORPORATION OF NEW YORK.

BLUE-VIOLET AZO DYE.

1,169,329.     Specification of Letters Patent.     Patented Jan. 25, 1916.

No Drawing.     Application filed March 23, 1915. Serial No. 16,470.

*To all whom it may concern:*

Be it known that I, MATTHIAS LATTEN, doctor of philosophy, chemist, citizen of the German Empire, residing at Leverkusen, near Cologne, Germany, have invented new and useful Improvements in Blue-Violet Azo Dye, of which the following is a specification.

I have found that a new and valuable azo-dye can be obtained by combining the tetrazo compound of 1-5-naphthylenediamin-3.7-disulfonic acid with two molecules of cresidin further tetrazotizing the resulting disazodye and combining the tetrazo compound with two molecules of resorcin.

My new azo coloring matter is after being dried and pulverized in the shape of its alkaline salt a grayish-black powder soluble in hot water with a reddish violet coloration and soluble in concentrated sulfuric acid with a greenish-blue coloration. It has in a free state most probably the formula:

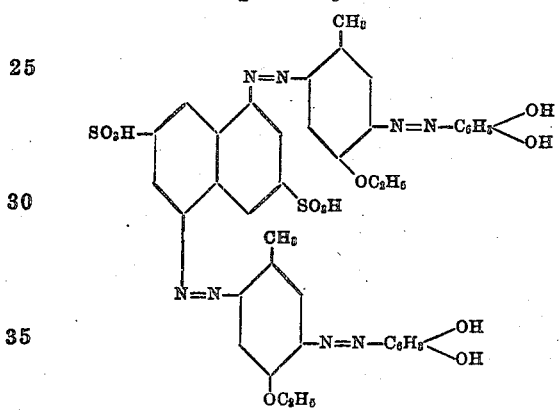

Upon treatment with stannous chlorid and hydrochloric acid it is broken up into 1.5-naphthylenediamin-3.7-disulfonic acid, aminocresidin:

$C_6H_2.CH_3:NH_2:OC_2H_5:NH_2(1:3:4:6)$ and aminoresorcin. It dyes cotton violet shades which are rendered fast to washing by an after treatment with formic aldehyde.

In order to illustrate the new process more fully the following example is given, the parts being by weight:—18.1 parts of the disodium salt of 1.5-naphthylenediamin-3.7-disulfonic acid are dissolved in 330 parts of hot water, the solution is cooled, tetrazotized with 3.5 parts of sodium nitrite and 13.8 parts of hydrochloric acid and to the resulting tetrazo compound a weakly acid (HCl) solution of 13.7 parts of cresidin is added. The copulation is completed by the addition of so much sodium acetate that the acid reaction to Congo paper disappears. The dye is isolated from the acid solution previously acidulated (acid to Congo paper) by the addition of common salt. The paste thus obtained is dissolved in soda and water and tetrazotized with 3.5 parts of sodium nitrite and 13.8 parts of hydrochloric acid. The tetrazo compound is then added at 0° C. into a soda alkaline solution of 11 parts of resorcin. The mixture is heated, the dye is salted out, filtered off and dried.

I claim:—

The herein described new azodyestuff which has in a free state most probably the formula:

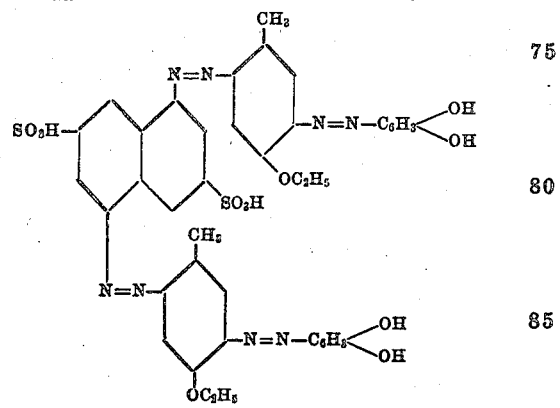

and which is after being dried and pulverized in the shape of its alkaline salt a grayish-black powder, soluble in hot water with a reddish-violet coloration and in concentrated sulfuric acid with a greenish-blue coloration; by treating it with stannous chlorid and hydrochloric acid it is broken up into 1.5-naphthylenediamin-3.7-disulfonic acid, aminocresidin and aminoresorcin; dyeing cotton violet shades which are rendered fast to washing by an aftertreatment with formic aldehyde, substantially as described.

In testimony whereof I have hereunto set my hand in the presence of two subscribing witnesses.

MATTHIAS LATTEN. [L. S.]

Witnesses:
   HELEN NUFER,
   ALBERT NUFER.